March 5, 1935. F. M. BLAHNIK 1,992,988
MILK CONDITIONER
Filed Oct. 16, 1933
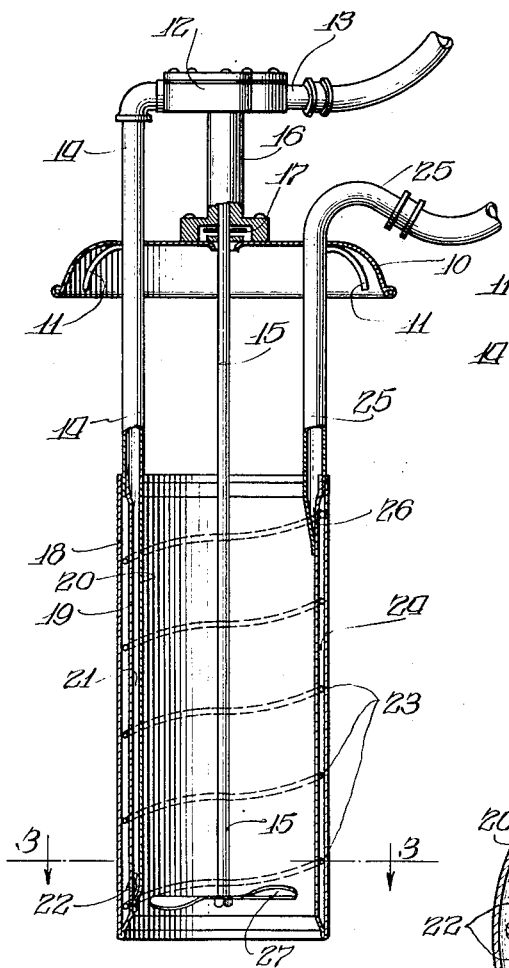
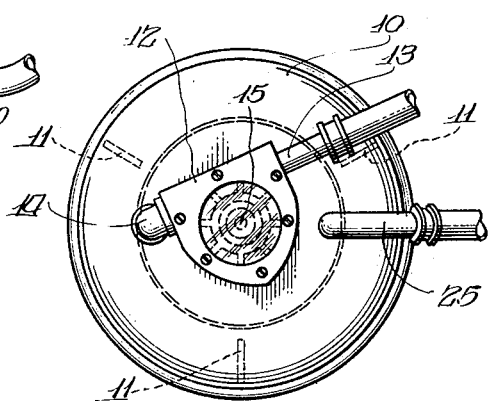
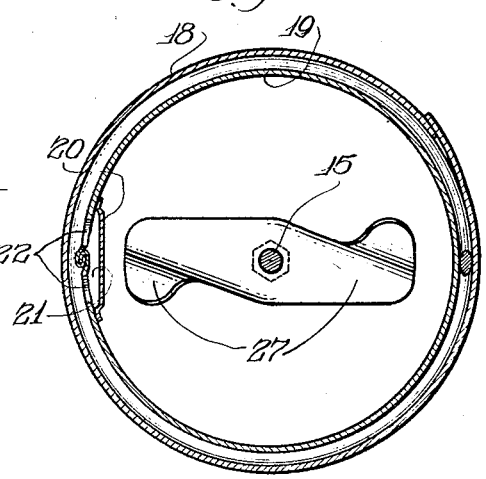
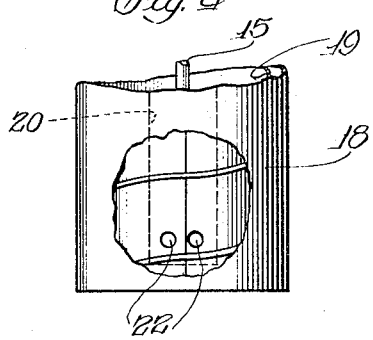
Inventor:
Frank M. Blahnik.
By: Brayton Richards
Attorney.

Patented Mar. 5, 1935

1,992,988

UNITED STATES PATENT OFFICE 1,992,988

MILK CONDITIONER

Frank M. Blahnik, Green Bay, Wis.

Application October 16, 1933, Serial No. 693,816

4 Claims. (Cl. 257—74)

The invention relates to improvements in milk conditioners and has for its primary object the provision of an improved device of the character indicated adapted and arranged for the conditioning of milk in milk cans, which is of simple construction, highly efficient in use and capable of economical production.

Other objects will appear hereinafter.

The invention consists in the combinations and arrangements of parts hereinafter described and claimed.

The invention will be best understood by reference to the accompanying drawing forming a part of this specification, and in which Fig. 1 is a side view, shown partially in section, of a milk conditioner embodying the invention;

Fig. 2 a top plan view of the same;

Fig. 3 a section taken substantially on line 3—3 of Fig. 1; and

Fig. 4 a detail elevation of the lower end of a conditioning element employed in the construction, with portions broken away for the sake of clearness.

The embodiment of the invention illustrated in the drawing comprises a cover member 10 adapted and arranged to fit over and rest upon the mouth of an ordinary milk can, ribs 11 being formed on the underside of said cover member to contact with the mouth of the can and thereby form circulation spaces permitting of free circulation into and out of the can.

Arranged on top of the cover member 10 is a water motor 12 of any suitable or desired construction, having an inlet or supply pipe 13 and a discharge pipe 14 leading downwardly therefrom through the cover member 10. The shaft 15 of the water motor 12 also leads downwardly from said motor through said cover member, as shown.

The water motor 12 is supported on the cover member 10 by means of a combined bearing and sleeve member 16, as shown, and a splasher plate 17 is secured on the shaft 15 below the sleeve 16 to prevent any leakage from the motor entering the milk can through the cover member 10.

A milk conditioning member in the form of two telescoping tubes 18—19, arranged as shown with a circulation space between them, is secured at the lower end of the pipe 14. A vertical strip 20 is secured to the inner side of the tube 19, as shown, to form a vertical circulation space 21, and the pipe 14 leads into the space 21 as shown. At the lower end of the space 21 circulation openings 22 lead into the space between the tubes 18—19 and a helical partition 23 in the form of a wire rod is coiled around the tube 19 to form a helical circulation passageway 24 extending from the bottom to the top of the space between said tubes, as shown. A discharge pipe 25 is connected as shown with the top of said conditioning element at a point diametrically opposite the pipe 14 and communicates with the passageway 24 through an opening 26, said pipe 25 extending upwardly through the cover member 10, as shown. At the lower end of the shaft 15 a circulator 27 in the form of a propeller blade is mounted within the conditioning element and is so arranged as to cause circulation of milk downwardly from the bottom of said conditioning element and into the top thereof.

In use and in operation, the conditioner is placed upon the top of an ordinary milk can with the conditioning element 18—19 extending downwardly into the can with the lower end thereof elevated somewhat above the bottom of the can so as to permit of free circulation. Then either hot or cold water is circulated through the pipes 13 and 25. If cold water is circulated, the milk will be cooled. If hot water is circulated, the milk will be heated.

The circulating water will cause operation of the motor 12 and consequent operation of the circulator blade 27, thereby actively circulating the milk through and around the conditioning element 18—19. The water passing downwardly through the pipe 14 will enter the lower end of the passageway 24 through the opening 22 and pass upwardly and around through the hollow walls of said conditioning element, thereby quickly and efficiently conditioning the milk in the can. In this manner, by using hot water the milk may be pasteurized or by using cold water the milk can be cooled, or by using first hot and then cold water the device may be used as a cheese starter. In this way a simple and effective milk conditioner is provided which is capable of economical production. The specific form and arrangement of parts disclosed is a simple and efficient one for the purpose.

While I have illustrated and described the preferred form of construction for carrying my invention into effect, this is capable of variation and modification without departing from the spirit of the invention. I, therefore, do not wish to be limited to the precise details disclosed, but desire to avail myself of such variations and modifications as fall within the scope of the appended claims.

I claim:

1. A device of the class described comprising a conditioning element adapted and arranged for insertion in a milk can, said conditioning element being formed of two telescoping tubes in spaced relation to form hollow walls; a helical partition in the space between said tubes forming a helical passageway from bottom to top; a circulation connection with the bottom of said passageway formed by means of a vertical strip secured across a section of the inner surface of the inner tube, there being an opening connecting the lower portion of the space formed thereby with the lower portion of said passageway; and a discharge connection with the top of said passageway.

2. A device of the class described comprising a conditioning element adapted and arranged for insertion in a milk can, said conditioning element being formed of two telescoping tubes in spaced relation to form hollow walls; a helical partition in the space between said tubes forming a helical passageway from bottom to top; a circulation connection with the bottom of said passageway formed by means of a vertical strip secured across a section of the inner surface of the inner tube, there being an opening connecting the lower portion of the space formed thereby with the lower portion of said passageway; a discharge connection with the top of said passageway; and a circulator in said conditioning element arranged to circulate the milk therethrough.

3. A device of the class described comprising a cover member adapted and arranged to rest on a milk can; a water motor mounted on said cover; a shaft from said motor extending downwardly through said cover and into the mouth of the can; a supply pipe leading to said motor and a discharge pipe leading therefrom and downwardly through said cover into the mouth of the can; a conditioning element at the lower end of said discharge pipe, said conditioning element being formed of two telescoping tubes in spaced relation to form hollow walls, said discharge pipe communicating with the lower portion of the space between said walls; a helical partition in said space between said tubes forming a helical passageway from bottom to top; a circulator in the form of a propeller mounted at the lower end of said motor shaft and lowered within said conditioning element; and a discharge pipe connected at the upper end of said passageway and extending through said cover member.

4. A device of the class described comprising a cover member adapted and arranged to rest on a milk can; a water motor mounted on said cover member; a shaft from said water motor extending downwardly through said cover member; a combined supporting and bearing sleeve on the top of said cover member surrounding said shaft; and a splash plate on said shaft below said sleeve and above said cover member.

FRANK M. BLAHNIK.